(12) United States Patent
Zhang et al.

(10) Patent No.: US 11,656,902 B2
(45) Date of Patent: May 23, 2023

(54) DISTRIBUTED CONTAINER IMAGE CONSTRUCTION SCHEDULING SYSTEM AND METHOD

(71) Applicant: NANJING UNIVERSITY OF POSTS AND TELECOMMUNICATIONS, Jiangsu (CN)

(72) Inventors: Dengyin Zhang, Jiangsu (CN); Junjiang Li, Jiangsu (CN); Zijie Liu, Jiangsu (CN); Lin Zhu, Jiangsu (CN); Yi Cheng, Jiangsu (CN); Yingying Zhou, Jiangsu (CN); Zhaoxi Shi, Jiangsu (CN)

( * ) Notice: Subject to any disclaimer, the term of this patent is extended or adjusted under 35 U.S.C. 154(b) by 83 days.

(21) Appl. No.: 17/597,890

(22) PCT Filed: Jan. 6, 2021

(86) PCT No.: PCT/CN2021/070429
§ 371 (c)(1),
(2) Date: Jan. 28, 2022

(87) PCT Pub. No.: WO2021/143590
PCT Pub. Date: Jul. 22, 2021

(65) Prior Publication Data
US 2022/0171652 A1    Jun. 2, 2022

(30) Foreign Application Priority Data
Jan. 14, 2020 (CN) .......................... 202010034706.5

(51) Int. Cl.
*G06F 9/48* (2006.01)
(52) U.S. Cl.
CPC .................. *G06F 9/4843* (2013.01)
(58) Field of Classification Search
CPC .................................................... G06F 9/4843
See application file for complete search history.

(56) References Cited

U.S. PATENT DOCUMENTS

2014/0173101 A1* 6/2014 Sayama ................ H04L 43/10
709/224
2017/0286187 A1* 10/2017 Chen ........................ G06F 9/48
(Continued)

FOREIGN PATENT DOCUMENTS

| CN | 106790483 A | 5/2017 |
| CN | 108737548 A | 11/2018 |

(Continued)

OTHER PUBLICATIONS

Chadi Assi; An Infrastructure-Assisted Workload Scheduling for Computational Resources Exploitation in the Fog-Enabled Vehicular Network; vol. 7, No. 6, Jun. 2020.*

(Continued)

*Primary Examiner* — Meng Ai T Tan
*Assistant Examiner* — Zujia Xu

(57) ABSTRACT

Disclosed in the present invention are a distributed container image construction scheduling system and method. The system includes a construction node and a management node. The construction node includes an image constructor for executing a construction task issued by the management node. The management node includes a console and a scheduler. The console is responsible for acquiring the relevant parameters such as a development dependency library and system configuration required by a user, and generating tasks with these parameters and sending same to the scheduler. The scheduler is used for receiving the tasks sent by the console, detecting the legitimacy of the tasks, and sending the tasks to the corresponding construction node to be run.

11 Claims, 3 Drawing Sheets

(56) References Cited

U.S. PATENT DOCUMENTS

2019/0347121 A1    11/2019  Luo et al.
2019/0370264 A1*   12/2019  Wang .................... G06Q 10/06
2020/0019983 A1*    1/2020  Johnston, Jr. ...... G06Q 30/0275

FOREIGN PATENT DOCUMENTS

CN         110275761  A    9/2019
CN         110647580  A    1/2020
CN         1112408006 A    6/2020

OTHER PUBLICATIONS

Duffy, Jim; Platinum to link schedules; 1996, vol. 13 (23), p. 1 7.*
International Search Report from PCT/CN2021/070429 dated Apr. 1, 2021, 3 pgs.

* cited by examiner

DISTRIBUTED CONTAINER IMAGE CONSTRUCTION SCHEDULING SYSTEM AND METHOD

CROSS REFERENCE TO RELATED APPLICATION(S)

This application claims the priority to Chinese Patent Application No. 202010034706.5, filed with the China National Intellectual Property Administration (CNIPA) on Jan. 14, 2020 and entitled "DISTRIBUTED CONTAINER IMAGE CONSTRUCTION SCHEDULING SYSTEM AND METHOD", which is incorporated herein by reference in its entirety.

TECHNICAL FIELD

The present disclosure relates to the technical field of cloud computing, and in particular, to a distributed container image construction scheduling system and method.

BACKGROUND ART

With the development of cloud computing technologies, microservices can be deployed in containers to greatly improve resource utilization. However, as cloud computing services become increasingly diversified and complex, it is much complicated for software engineers to manually compile container image files to call continuous integration and continuous delivery (CI/CD) tools to construct images. In addition, constructing massive container images on a single node may lead to performance bottleneck and tough maintenance. This cannot meet current requirements, especially when container image files for most applications are normalized. In view of this, a distributed container image construction system is required to optimize existing container image construction methods so as to expedite image construction, efficiently utilize resources, and simplify processes.

A wide variety of businesses involve cloud computing. Different users construct different container images based on their program dependencies. In addition, image construction needs to be iterated accordingly. As a result, new image construction tasks continuously emerge with time. Therefore, how to send and run these image construction tasks in a distributed image construction system is an urgent problem to be resolved. In particular, an optimization solution is required to properly distribute and run these tasks on corresponding construction nodes to ensure satisfied image construction efficiency.

SUMMARY

Currently, container image construction in cloud computing features low efficiency, complex process, and low reliability. Given this, the present disclosure provides a distributed container image construction scheduling system and method.

To this end, an embodiment of the present disclosure provides a distributed system for constructing and scheduling a container image that includes a management node and a construction node, where the management node is configured to manage generation and scheduling of a task for constructing the container image in a distributed manner and the management node includes a console and a scheduler, where the console is configured to obtain a task parameter, create a task, transmit the task to the scheduler, and feed an image construction status back to a user, and the scheduler is configured to receive the task transmitted from the console, generate a task message, transmit the task message to a corresponding construction node for running, and wait and receive a task execution result from the corresponding construction node; and the construction node is configured to perform a task issued by the management node, where each construction node includes an image constructor, and the image constructor is configured to receive the task message transmitted from the scheduler, and return an execution result to the scheduler.

Further, the scheduler is a web server and the image constructor is a Google Remote Procedure Call (gRPC) server.

Further, the scheduling system includes at least three management nodes and multiple construction nodes.

Further, only one management node is active at a time, and management nodes can be seamlessly switched by using a heartbeat detection technology and virtual IP (VIP) technology.

According to another aspect, an embodiment of the present disclosure provides a scheduling method for constructing a distributed container image, including:

initializing the management node and the construction node, where the initializing the management node and construction node includes: setting a scheduler on the management node to a web server in a block listening status and an image constructor on the construction node to a gRPC server in a block listening status;

creating, by the console, an image construction task, and performing, by the scheduler, a check and generating a task message;

determining construction nodes to which the task message can be sent;

determining an optimal working node from the determined construction nodes;

sending, by the scheduler, the task message to the optimal working node and generating a task object;

performing, by the optimal working node, the task and sending feedback on a construction status to the management node;

informing, by the management node, a user of the feedback on the construction status; and entering an initialization status of the management node and construction node again.

Further, setting an image constructor on the construction node to a gRPC server in a block listening status includes:

initiating the scheduler on the management node; checking, by the scheduler, whether a profile of the scheduler exists; and reading, if the profile exists, IP addresses and gRPC service ports of all construction nodes from the profile and storing the IP addresses and gRPC service ports to a cache, where the profile includes a list of IP addresses and gRPC service ports of construction nodes;

setting, by the scheduler, a number of concurrent threads in the cache as workers, and setting a task list to empty;

checking, by the scheduler, whether a Transport Layer Security (TLS) public key and private key that are used to encrypt web communication and gRPC communication exist on the current management node; and using, if the TLS public key and private key exist, the TLS public key and private key to enable a TLS authentication-enabled web server in the scheduler to block monitoring, and enabling the console to wait for the user to create a task; and if the profile of the scheduler does not exist or the TLS public key and private key that are used to encrypt web communication and gRPC communication do not exist, recording, by the scheduler, a cause of failure, generating and recording a message locally, sending fault information to an operation and maintenance (O&M) engineer, and exiting a scheduler program; and the setting an image constructor on the construction node to a gRPC server in a block listening status includes:

initiating the image constructor on the construction node; and attempting, by the image constructor, to interface to a container engine on the current construction node and setting, if the image constructor is interfaced to the container engine, values of a status variable, health variable, and image construction quantity variable in a cache of the construction node into true, healthy, and zero respectively;

checking, by the image constructor, whether a TLS public key and private key that are used to encrypt gRPC communication exist on the current construction node; and using, if the TLS public key and private key exist, the TLS public key and private key to enable a TLS authentication-enabled gRPC server in the image constructor to block monitoring, and waiting for the scheduler to obtain node information of the image constructor or issue a task; and if the image constructor fails to interface to the container engine or the TLS public key and private key that are used to encrypt gRPC communication do not exist, recording, by the image constructor, a cause of failure, generating and recording a message locally, sending fault information to an O&M engineer, and exiting an image constructor program.

Further, the creating, by the console, an image construction task, and performing, by the scheduler, a check and generating a task message includes:

creating, by the console on the management node, the task, where before the task is created, an image name, a graphics processing unit (GPU) value, a name and version of a development framework, and a third-party dependency are specified and a heterogeneous resource value and test mode value are entered;

serializing, by the console, the task into a structural object and sending the structural object to the scheduler; and checking, by the scheduler, whether the structural object is valid, where the checking whether the structural object is valid includes:

checking whether the image name is empty; and if the image name is empty, generating an error message that indicates an empty image name, sending the error message to the console to inform the user, canceling generating the task, and entering a blocking status again to wait for the user to create a task on the console; or if the image name is not empty, continuing, by the scheduler, to check whether the heterogeneous resource value in the structural object is true; and if the heterogeneous resource value is not true or is empty, generating an error message that indicates an invalid heterogeneous resource value, sending the error message to the console to inform the user, canceling generating the task, and entering a blocking status again to wait for the user to create a task on the console; or if the heterogeneous resource value is true, continuing to check whether the development framework in the structural object is specified; and if the development framework is unspecified, generating an error message that indicates an unspecified development framework, sending the error message to the console to inform the user, canceling generating the task, and entering a blocking status again to wait for the user to create a task on the console; or if the development framework is specified, continuing to check whether the test mode value in the structural object is true; and if the test mode value is not true or is empty, generating an error message that indicates an invalid test mode value, sending the error message to the console to inform the user, canceling generating the task, and entering a blocking status again to wait for the user to create a task on the console; or if the test mode value is true, determining that the task passes the check, and generating, by the scheduler, the task message based on task content.

Further, the determining construction nodes to which the task message can be sent include:

creating, by the scheduler on the management node, a table of active construction nodes in a cache, where the table includes IP addresses, gRPC service ports, and communication statuses of construction nodes;

performing communication tests between all construction nodes in the cache of the scheduler and gRPC services of these construction nodes by using the IP addresses and gRPC service ports, and saving construction nodes that successfully communicate with the gRPC services into the table of active construction nodes in the cache;

determining whether the number of active construction nodes in the table of active construction nodes is greater than that of workers; if the number of active construction nodes is greater than that of workers, performing no operation; and if the number of active construction nodes is less than that of workers, setting, by the scheduler, the number of active construction nodes to that of workers, and enabling multiple threads to concurrently obtain resource information and status information of each construction node in the table of active construction nodes, where the resource information of each construction node includes a number of central processing units (CPUs), a CPU clock speed, a total memory capacity, and an available memory capacity of the construction node and a system load, and the status information of each construction node includes a status variable, health variable, and image construction quantity variable of the construction node;

determining, by the scheduler one after another, whether a value of the status variable of a construction node in the table of active construction nodes is true; and performing no operation if the value of the status variable is true, or deleting the construction node from the table of active construction nodes if the value of the status variable is false;

determining, by the scheduler one after another after values of status variables of all construction nodes are determined, whether a value of the health variable of a construction node in the table of active construction nodes is set to healthy; and performing no operation if the value of the health variable is set to healthy, or deleting the construction node from the table of active construction nodes if the value of the health variable is not set to healthy; and using, after values of health variables of all construction nodes are determined, remaining construction nodes in the table of active construction nodes as the construction nodes to which the task message can be sent.

Further, determining an optimal working node from the determined construction nodes includes:

calculating a performance score and task score for each construction node in the table of active construction nodes, where Perform Score =

$$\left(\frac{CpuCores}{MaxCpuCores} + \frac{CpuFrequency}{MaxCpuFrequency}\right) \times 100 \times CpuWeight +$$

$$\left(1 - \frac{SystemLoad}{CpuCores}\right) \times 100 \times LoadWeight +$$

$$\left(\frac{FreeMemory}{TotalMemory} \times 3 + \frac{FreeMemory}{MaxFreeMemory} \times 7\right) \times 100 \times MemoryWeight$$

$$\text{Task Score} = \left(\frac{MaxBuildNumber - BuildNumber}{MaxBuildNumber}\right) \times 100 \times TaskWeight$$

Perform Score indicates the performance score, Task Score indicates the task score, CpuWeight indicates a CPU weight, LoadWeight indicates a load weight, MemoryWeight indicates a memory weight, TaskWeight indicates a task weight, CpuCores indicates the number of CPUs of the construction node, CpuFrequency indicates the clock speed of the construction node, TotalMemory indicates the total memory capacity of the construction node, FreeMemory indicates the available memory capacity of the construction node, BuildNumber indicates the image construction quantity variable, SystemLoad indicates the system load, MaxCpuCores indicates a number of CPUs of a construction node whose CPU quantity is greater than that of any other construction node in the table of active construction nodes, MaxCpuFrequency indicates a clock speed of a construction node whose clock speed is greater than that of any other construction node in the table of active construction nodes, MaxFreeMemory indicates an available memory capacity of a construction node whose available memory capacity is greater than that of any other construction node in the table of active construction nodes, and MaxBuildNumber indicates an image construction quantity of a construction node whose image construction quantity is greater than that of any other construction node in the table of active construction nodes;

using, by the scheduler, a sum of the performance score and task score as a final total score of the construction node and storing the final total score to the cache; and determining, by the scheduler, a construction node having a highest total score as the optimal working node.

Further, the sending, by the scheduler, the task message to the optimal working node and generating a task object includes:

obtaining, by the scheduler, an IP address and a gRPC service port of the optimal working node;

encrypting, by the scheduler, the task message in a gRPC mode by using a TLS public key and private key of the management node, sending the encrypted task message to the optimal working node based on the IP address and gRPC service port of the optimal working node, and asynchronously generating the task object, where the task object includes the task message, a scheduling node, and the construction status, where the scheduling node is the optimal working node and the construction status is set to false; and entering a blocking state of the scheduler and waiting for the optimal working node to send the feedback on the construction status.

Further, the performing, by the optimal working node, the task and sending feedback on a construction status to the management node includes:

determining, by an image constructor of the optimal working node, whether values of the status variable and health variable on the optimal working node in a cache of the construction node are true and healthy respectively; and if the values of the status variable and health variable are false and unhealthy respectively, using the values of these two variables as the feedback on the construction status, attaching an error tag, decrementing a value of the image construction quantity variable in the cache of the construction node by one, and sending the feedback on the construction status to the management node, or if the values of the status variable and health variable are true and healthy respectively, incrementing a value of the image construction quantity variable in the cache of the construction node by one; extracting, from the task message, an image name, a GPU value, a name and version of a development framework, a third-party dependency, a heterogeneous resource value, and a test mode value; calling a container engine to construct an image based on these parameters; using, after the image is constructed, a construction completion result from the container engine as the feedback on the construction status, attaching a completion tag, decrementing the value of the image construction quantity variable in the cache of the construction node by one, and sending the feedback on the construction status to the management node; and using, if an error occurs when the image is being constructed by calling the container engine and image construction is stopped, an error message returned by the container engine as the feedback on the construction status, attaching an error tag, decrementing the value of the image construction quantity variable in the cache of the construction node by one, and sending the feedback on the construction status to the management node.

Further, the informing, by the management node, a user of the feedback on the construction status includes:

checking, by the scheduler on the management node after receiving the feedback on the construction status, whether the feedback on the construction status includes an error tag, and setting, if the feedback on the construction status does not include an error tag, the construction status in the task object to true to indicate that the task is constructed; or checking, by the scheduler if the feedback on the construction status includes an error tag, whether an error message in the feedback on the construction status indicates an unhealthy construction node; and rescheduling the task if the error message indicates an unhealthy construction node, or sending, if the error message does not indicate an unhealthy construction node, the feedback on the construction status to the console to inform the user of the error message and content.

According to the specific embodiments provided in the present disclosure, the present disclosure discloses the following technical effects:

The present disclosure provides a distributed system for constructing a container image and uses the distributed system to expedite container image construction. Compared with those of constructing massive container images on a single node, performance bottleneck and maintenance challenges of this system are alleviated. This system uses a scheduler to distribute construction tasks rationally and balances a task load on a construction node so that resources on the construction node can be efficiently utilized, thereby ensuring system stability and improving efficiency in container image construction.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

To make the foregoing objectives, features, and advantages of the present disclosure clearer and more comprehensible, the present disclosure is now further described in detail below with reference to the accompanying drawings and specific embodiments.

Figure 1:
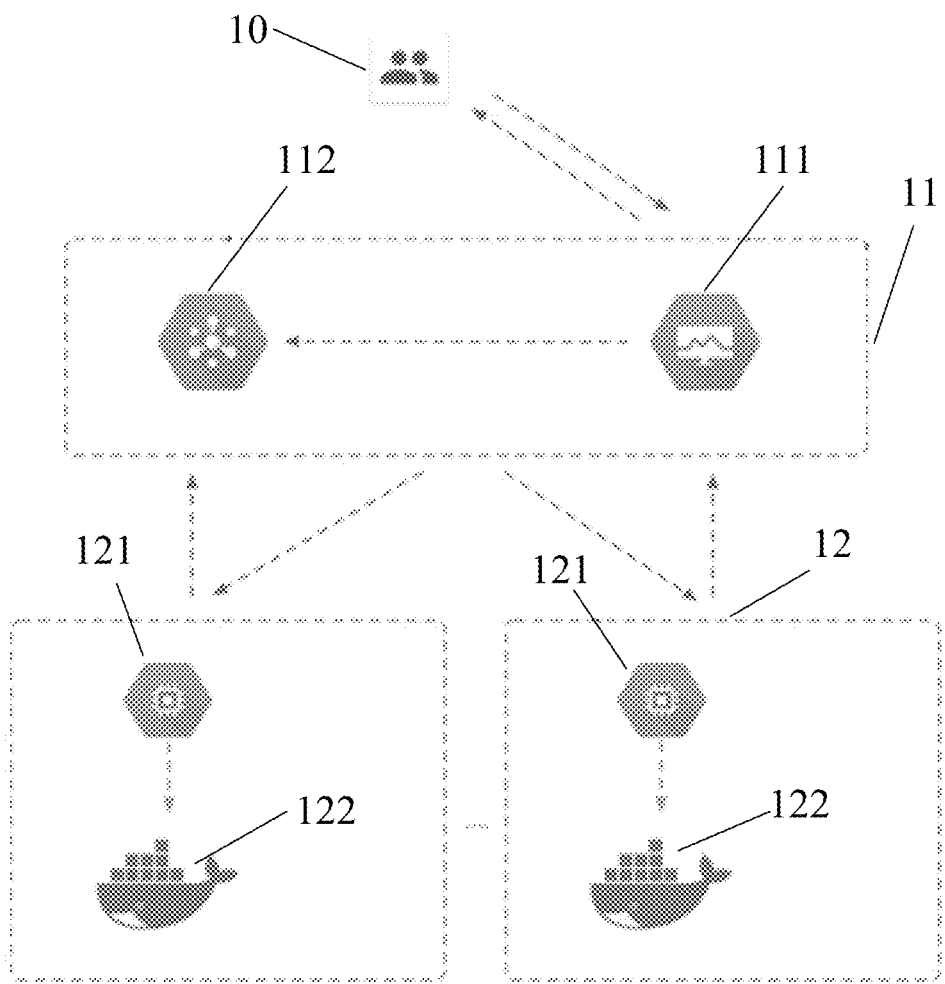
FIG. 1 is an architecture diagram of a distributed system for constructing a container image according to an embodiment of the present disclosure.

One aspect of the present disclosure provides a distributed system for constructing and scheduling a container image, as shown in FIG. 1. The system includes a construction node 12 and a management node 11. The management node 11 is configured to manage generation and scheduling of a task for constructing a container image in a distributed manner. The management node 11 includes a console 111 and a scheduler 112.

The console 111 is configured to obtain parameters required by a user 10, such as a development dependency library, development framework, version, heterogeneous resource value, and test mode value, and transmit tasks of generating these parameters to the scheduler 112, and feed an image construction status back to the user 10.

The scheduler 112 is a web server and is configured to: receive the tasks transmitted from the console 111, filter the tasks, send tasks that are obtained after filtering to corresponding construction nodes 12 for running, and wait and receive task execution results from the corresponding construction nodes 12.

The construction node 12 is configured to run the tasks issued by the management node 11. Each construction node 12 includes an image constructor 121.

The image constructor 121 is a gRPC server and is configured to receive tasks sent from the scheduler 112, run the tasks, and return execution results to the scheduler 112 after these tasks are run.

In an actual production environment, at least three management nodes 11 and multiple construction nodes 12 are set. A quantity of nodes can be increased or decreased as needed.

Only one management node 11 is operating at a time and other management nodes 11 are in the idle state. Management nodes 11 can be seamlessly switched by using a heartbeat detection technology and virtual IP technology in cloud computing. This ensures an efficient and available system and avoids a single point of failure.

Another aspect of the present disclosure provides a distributed method for constructing and scheduling a container image. The method includes the following steps:

1. System Initialization

Construction Node 12:

In step 201, an image constructor 121 is initiated on the construction node 12. The image constructor 121 first attempts to interface to a container engine 122 on the current construction node 12. If the image constructor 121 is interfaced to the container engine 122, the image constructor 121 sets values of a status variable, health variable, and image construction quantity variable of construction node 12 in a cache of the construction node 12 into true, healthy, and zero respectively.

In step 202, the image constructor 121 checks whether a TLS public key and private key that are used to encrypt gRPC communication exist on the current construction node 12. If the TLS public key and private key exist, the image constructor 121 calls the TLS public key and private key to enable a TLS authentication-enabled gRPC server in the image constructor 121 to block monitoring, and waits for the scheduler 121 to obtain node information of the image constructor 121 or issue a task.

In step 203, if the image constructor 121 fails to interface to the container engine 122 or the TLS public key and private key that are used to encrypt gRPC communication do not exist, the image constructor 121 records a cause of failure, generates a message, records the message locally, sends fault information to an O&M engineer by email, and exits an image constructor 121 program.

Management Node 11:

A scheduler 112 is initiated on the management node 11. The scheduler 112 first checks whether a profile of the scheduler 112 exists. The profile includes a list of IP addresses and gRPC service ports of construction nodes 12. If the profile exists, the scheduler 112 reads the IP addresses and gRPC service ports of all construction nodes 12 from the profile and saves the IP addresses and gRPC service ports to a cache. Then, the scheduler 112 sets a number of concurrent threads as workers to an initial value of 5, and sets a task list to empty. An initial number of workers in a production environment can be adjusted based on actual needs.

The scheduler 112 checks whether a TLS public key and private key that are used to encrypt web and gRPC communications exist on the current management node 11. If the TLS public key and private key exist, the scheduler 112 calls the TLS public key and private key to enable a TLS authentication-enabled web server in the scheduler 112 to block monitoring, and in step 204, the scheduler enables the console 111 to wait for the user to create a task.

If the profile of the scheduler 112 does not exist or the TLS public key and private key that are used to encrypt web and gRPC communications do not exist, the scheduler 112 records a cause of failure, generates a message, records the message locally, sends fault information to an O&M engineer, and exits a scheduler 112 program.

2. Generation and Check of an Image Construction Task

Figure 2:
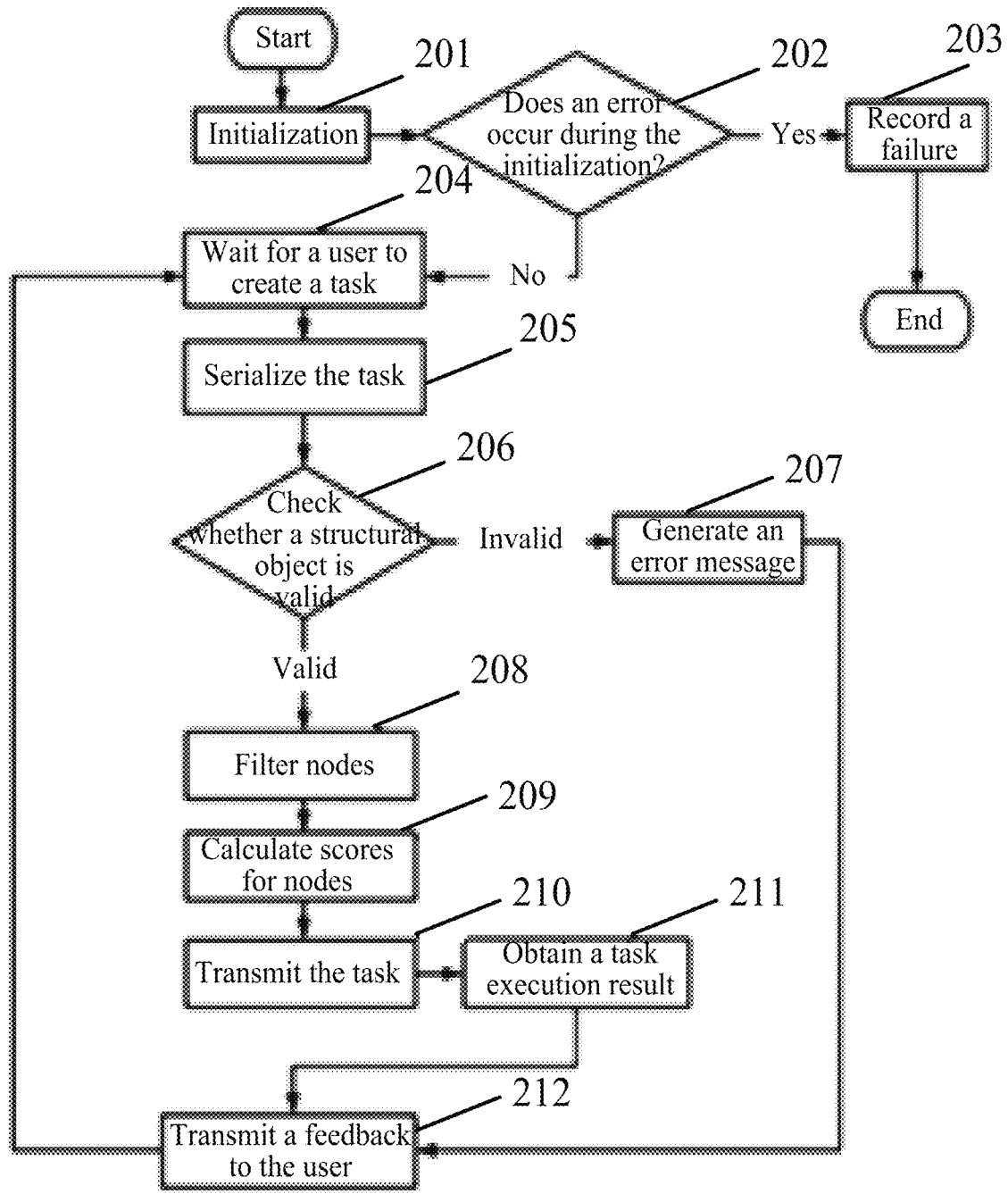
FIG. 2 is a flowchart of a management node in a distributed system for constructing a container image according to an embodiment of the present disclosure.

Referring to FIG. 2, a user 10 creates a task by using a console 111 on a management node 11. Before the task is created, an image name, a GPU value, a name and version of a development framework, and a third-party dependency are specified and a heterogeneous resource value and test mode value are entered.

In step 205, the console 111 serializes the task into a structural object and sends the structural object into a scheduler 112.

Specifically, in step 206, the scheduler 112 checks whether the structural object is valid. The details are as follows:

The scheduler 112 first checks whether the image name is empty. If the image name is empty, the scheduler 112 generates (step 207) an error message that indicates an empty image name, sends (step 212) the error message to the console 111 to inform the user 10, cancels generating the task, and enters a blocking status again to wait for the user 10 to create a task on the console 111.

If the image name is not empty, the scheduler 112 continues to check whether the heterogeneous resource value in the structural object is true. If the heterogeneous resource value is not true or is empty, the scheduler 112 generates (step 207) an error message that indicates an invalid heterogeneous resource value, sends (step 212) the error message to the console 111 to inform the user 10, cancels generating the task, and enters a blocking status again to wait for the user 10 to create a task on the console 111.

If the heterogeneous resource value is true, the scheduler 112 continues to check whether the development framework in the structural object is specified. If the development framework is unspecified, the scheduler 112 generates (step 207) an error message that indicates an unspecified development framework, sends (step 212) the error message to the console 111 to inform the user 10, cancels generating the task, and enters a blocking status again to wait for the user 10 to create a task on the console 111.

If the development framework is specified, the scheduler 112 continues to check whether the test mode value in the structural object is true. If the test mode value is not true or is empty, the scheduler 112 generates (step 207) an error message that indicates an invalid test mode value, sends (step 212) the error message to the console 111 to inform the user 10, cancels generating the task, and enters a blocking status again to wait for the user 10 to create a task on the console 111.

If the test mode value is true, it indicates that the task passes the check. In this case, the scheduler 112 generates a task message based on task content and then performs Step 3.

3. Filtering (Step 208) Construction Nodes 12.

Referring to FIG. 2, the scheduler 112 on the management node 11 first creates a table of active construction nodes 12 in the cache. The table includes IP addresses, gRPC service ports, and communication statuses of construction nodes 12. Then, the scheduler 112 attempts to perform asynchronous communication tests between all construction nodes 12 in the cache of the scheduler 112 in Step 1 and gRPC services of these construction nodes 12 by using the IP addresses and gRPC service ports and saves construction nodes 12 that successfully communicate with the gRPC services into the table of active construction nodes in the cache.

After that, the scheduler 112 determines whether the number of active construction nodes in the table of active construction nodes is greater than that of workers in Step 1. If the number of active construction nodes is greater than that of workers, the scheduler 112 performs no operation. If the number of active construction nodes is less than that of workers, the scheduler 112 sets the number of active construction nodes to that of workers and uses multiple threads to concurrently obtain resource information of each construction node 12 in the table of active construction nodes and status information of each construction node 12 in the cache in Step 1. The resource information of each construction node 12 includes a number of CPUs, a CPU clock speed, a total memory capacity, and an available memory capacity of the construction node 12 and a system load. The status information of each construction node 12 includes a status variable, health variable, and image construction quantity variable of the construction node 12. A number of concurrent threads that are used to obtain information about the active construction nodes equal the number of concurrent threads, that is, the number of workers, in the cache. In other words, threads whose quantity equals to that of workers are used to consume all construction nodes 12 that are available for communication and obtain resource information and status information of these construction nodes 12. Then, the scheduler 112 caches the information.

After information of the last construction node is cached, the scheduler 112 determines, one after another, whether a value of the status variable of a construction node 12 in the table of active construction nodes is true. If the value of the status variable is true, the scheduler 112 performs no operation. If the value of the status variable is false, the scheduler 112 deletes the construction node 12 from the table of active construction nodes. After values of status variables of all construction nodes 12 are determined, the scheduler 112 determines, one after another, whether a value of the health variable of a construction node 12 in the table of active construction nodes is set to healthy. If the value of the health variable is set to healthy, the scheduler 112 performs no operation. If the value of the health variable is not set to healthy, the scheduler 112 deletes the construction node 12 from the table of active construction nodes. After values of health variables of all construction nodes 12 are determined, the scheduler 112 performs Step 4.

4. Calculation (Step 209) of Scores for a Construction Node 12.

Referring to FIG. 2, the scheduler 112 first obtains a number of CPUs of a construction node 12 whose CPU quantity is greater than that of any other construction node 12 in the table of active construction nodes, a clock speed of a construction node 12 whose clock speed is greater than that of any other construction node 12 in the table of active construction nodes, an available memory capacity of a construction node 12 whose available memory capacity is greater than that of any other construction node 12 in the table of active construction nodes, and an image construction quantity of a construction node 12 whose image construction quantity is greater than that of any other construction node 12 in the table of active construction nodes. Then, the scheduler 112 uses MaxCpuCores, MaxCpuFrequency, MaxCpuFrequency, and MaxFreeMemory to indicate the number of CPUs, clock speed, available memory capacity, and image construction quantity respectively.

The scheduler 112 uses CpuCores, CpuFrequency, TotalMemory, FreeMemory, BuildNumber, SystemLoad to indicate the number of CPUs, clock speed, total memory capacity, available memory capacity, and image construction quantity variable of the construction node 12, and the system load that are obtained in Step 3 respectively. Then, the scheduler 112 asynchronously calculates a performance score and a task score for each construction node 12 in the table of active construction nodes based on the information, where the performance score and task score are indicated by Perform Score and Task Score respectively.

The performance score and task score are calculated based on the following formulas Perform Score =

$$\left(\frac{CpuCores}{\text{Max}CpuCores} + \frac{CpuFrequency}{\text{Max}CpuFrequency}\right) \times 100 \times CpuWeight +$$

$$\left(1 - \frac{SystemLoad}{CpuCores}\right) \times 100 \times LoadWeight +$$

$$\left(\frac{FreeMemory}{TotalMemory} \times 3 + \frac{FreeMemory}{\text{Max}FreeMemory} \times 7\right) \times 100 \times MemoryWeight$$

$$\text{Task Score} = \left(\frac{\text{Max}BuildNumber - BuildNumber}{\text{Max}BuildNumber}\right) \times 100 \times TaskWeight$$

Perform Score indicates the performance score, Task Score indicates the task score, CpuWeight indicates a CPU weight, LoadWeight indicates a load weight, Score MemoryWeight indicates a memory weight, TaskWeight indicates a task weight, CpuCores indicates the number of CPUs of the construction node 12, CpuFrequency indicates the clock speed of the construction node 12, TotalMemory indicates the total memory capacity of the construction node 12, FreeMemory indicates the available memory capacity of the construction node 12, BuildNumber indicates the image construction quantity variable, SystemLoad indicates the system load, MaxCpuCores indicates the number of CPUs of the construction node 12 whose CPU quantity is greater than that of any other construction node 12 in the table of active construction nodes, MaxCpuFrequency indicates the clock speed of the construction node 12 whose clock speed is greater than that of any other construction node 12 in the table of active construction nodes, MaxFreeMemory indicates the available memory capacity of the construction node 12 whose available memory capacity is greater than that of any other construction node 12 in the table of active construction nodes, and MaxBuildNumber indicates the image construction quantity of the construction node 12 whose image construction quantity is greater than that of any other construction node 12 in the table of active construction nodes.

Default values of CpuWeight, LoadWeight, MemoryWeight, and TaskWeight are 2, 2, 3, and 3 respectively.

After the performance score and task score are calculated, the scheduler 112 uses a sum of the two scores as a final total score and stores the final total score into the cache.

After a total score is calculated for the last construction node 12 in the table of active construction nodes, the scheduler 112 determines a construction node 12 having highest total score in the table of active construction nodes as an optimal working node and performs Step 5.

5. Distribution (Step 210) of an Image Construction Task.

Referring to FIG. 2, the scheduler 112 first obtains an IP address and a gRPC service port of the optimal working node that is obtained in Step 4 from the cache that is generated in Step 1.

Then, the scheduler 112 encrypts the task message that is generated in Step 2 in a gRPC mode by using the TLS public key and private key of the management node that are obtained in Step 1, sends an encrypted task message to the optimal working node based on the IP address and gRPC service port of the optimal working node, and asynchronously generates a task object. The task object includes a task message, a scheduling node, and a construction status. The scheduler 112 sets the task message to the task message that is generated by the scheduler 112 in Step 2, the scheduling node to the optimal working node that is obtained in Step 4, and the construction status to false. After that, the scheduler 112 enters a blocking state and waits (step 304) for the optimal working node to send feedback on construction status.

After the optimal working node receives the task message, an image constructor 121 on the optimal working node performs Step 6.

6. Performing an Image Construction Task.

Figure 3:
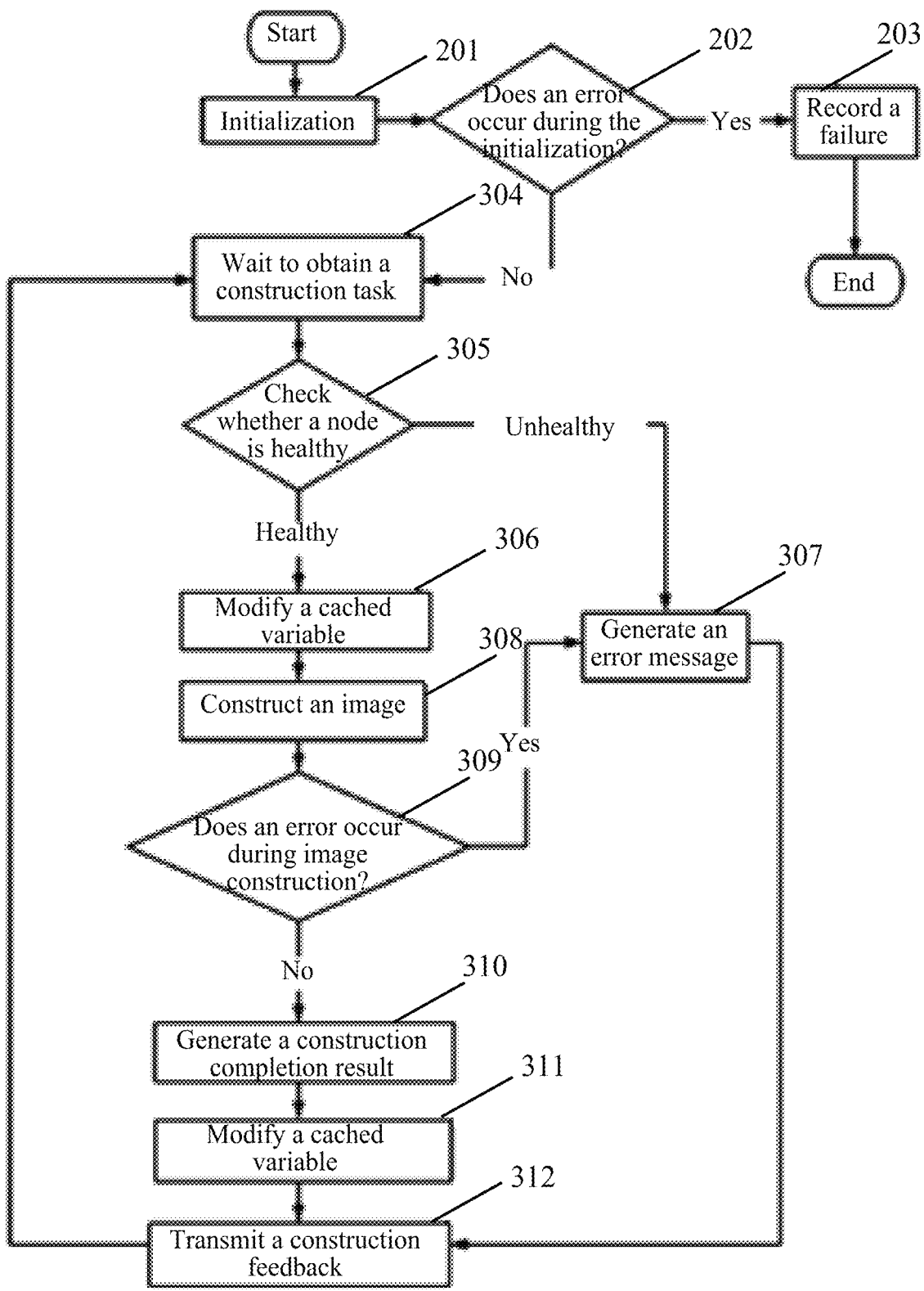
FIG. 3 is a flowchart of an optimal working node in a distributed system for constructing a container image according to an embodiment of the present disclosure.

Referring to FIG. 3, after receiving the task message from the management node 11, the image constructor 121 first determines (step 305) values of the status variable and health variable on the optimal working node in a cache of the construction node 12 are true and healthy respectively. If the values of the status variable and health variable are false and unhealthy respectively, the image constructor 121 uses (step 307) the values of these two variables as the feedback on the construction status, attaches an error tag, and performs Step 7.

If the values of the status variable and health variable are true and healthy respectively, the image constructor 121 increments (step 306) the value of the image construction quantity variable in the cache of the construction node 12 by one. Then, the image constructor 121 extracts, from the task message, the image name, GPU value, name and version of the development framework, third-party dependency, heterogeneous resource value, and test mode value, and calls (step 308) a container engine 122 to construct an image based on these parameters.

After the image is constructed, the image constructor 121 uses (step 310) a construction completion result from the container engine 122 as (step 211) the feedback on the construction status, attaches a completion tag, and performs Step 7.

If an error occurs when the image is being constructed (step 309) by calling the container engine 122 and image construction is stopped, the image constructor 121 uses (step 307) an error message returned by the container engine 122 as the feedback on the construction status, attaches an error tag, and performs Step 7.

7. Feedback of a Construction Status.

Referring to FIG. 3, the image constructor 121 decrements (step 311) the value of the image construction quantity variable in the cache of the construction node 12 by one and sends (step 312) the feedback on the construction status to the management node 11.

After receiving the feedback on the construction status, the scheduler 112 on the management node 11 checks whether the feedback includes an error tag. If the feedback on the construction status does not include an error tag, the scheduler 112 sets the construction status in the task object in Step 5 to true to indicate that construction is complete. If the feedback on the construction status includes an error tag, the scheduler 112 checks whether an error message in the feedback on the construction status indicates an unhealthy construction node 12. If the error message indicates an unhealthy construction node, the scheduler 112 makes the task go to Step 3 and reschedules the task. If the error message does not indicate an unhealthy construction node, the scheduler 112 sends (step 212) the feedback on the construction status to the console 111 to inform the user 10 of the error message and content.

After that, the image constructor 121 on the construction node 12 enters the block monitoring status as in Step 1 and waits for a new task to be issued. The scheduler 112 on the management node 11 enters the block monitoring status as in Step 1 and waits for a new task to be issued.

Each example of the present specification is described in a progressive manner, each example focuses on the difference from other examples, and the same and similar parts between the examples may refer to each other. Since the system disclosed in the embodiments corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A distributed container image construction scheduling system, comprising a management node and at least two or more construction nodes, the management node comprises a console and a scheduler, and each of the at least two or more construction nodes includes an image constructor, the system performs the steps of:
    initializing the management node and the at least two or more construction nodes; wherein upon initializing, the management node manages generation and scheduling of a task for constructing a container image in a distributed manner;
    wherein the console is to obtain a task parameter required by a user, create a task, transmit the task to the scheduler, and feed an image construction status back to the user, and
    wherein the scheduler is to receive the task transmitted from the console, generate a task message, transmit the task message to a corresponding one of the at least two or more construction nodes for running, and wait to receive a task execution result from the corresponding construction node;
    the corresponding construction node is to perform the task issued by the management node, and an image constructor of the corresponding construction node is to receive the task message transmitted from the scheduler, execute the task, and return the task execution result to the scheduler;
    wherein the initializing of the management node and the at least two or more construction nodes further comprising:
    setting the scheduler on the management node to a web server in a block listening status and the image constructor on the at least two or more construction nodes to a Google Remote Procedure Call (gRPC)server in a block listening status;
    creating, by the console, the task for constructing the container image, and performing, by the scheduler, a check and generating the task message;
    determining which construction nodes from the at least two or more construction nodes to which the task message can be sent;
    determining an optimal working node from the determined construction nodes;
    sending, by the scheduler, the task message to the optimal working node and generating a task object;
    performing, by the optimal working node, the task and sending feedback on the image construction status to the management node;
    informing, by the management node, to the user of the feedback on the image construction status; and
    entering an initialization status of the management node and the at least two or more construction nodes again.

2. The distributed container image construction scheduling system according to claim 1, wherein the scheduler is a web server and the image constructor is a Google Remote Procedure Call (gRPC) server.

3. The distributed container image construction scheduling system according to claim 1, wherein the scheduling system comprises at least three management nodes and multiple construction nodes.

4. The distributed container image construction scheduling system according to claim 3, wherein only one management node is active at a time, and management nodes can be seamlessly switched by using a heartbeat detection technology and virtual IP (VIP) technology.

5. The distributed container image construction scheduling system according to claim 1, wherein the setting a scheduler on the management node to a web server in a block listening status comprises:
    initiating the scheduler on the management node; checking, by the scheduler, whether a profile of the scheduler exists; and if the profile exists, reading IP addresses and gRPC service ports of all construction nodes from the profile and storing the IP addresses and gRPC service ports to a cache, wherein the profile comprises a list of IP addresses and gRPC service ports of construction nodes;
    setting, by the scheduler, a number of concurrent threads in the cache as workers, and setting a task list to empty;
    checking, by the scheduler, whether a Transport Layer Security (TLS) public key and private key that are used to encrypt web communication and gRPC communication exist on the current management node; and if the TLS public key and private key exist, enabling a TLS authentication—enabled web server in the scheduler by calling the TLS public key and private key to block monitoring, and enabling the console to wait for the user to create a task; and
    if the profile of the scheduler does not exist or the TLS public key and private key that are used to encrypt web communication and gRPC communication do not exist, recording, by the scheduler, a cause of failure, generating and recording a message locally, sending fault information to an operation and maintenance (O&M) engineer, and exiting a scheduler program; and
    the setting an image constructor on the construction node to a gRPC server in a block listening status comprises:
    initiating the image constructor on the construction node; and attempting, by the image constructor, to interface to a container engine on the current construction node and if the image constructor is interfaced to the container engine, setting values of a status variable, health variable, and image construction quantity variable in a cache of the construction node into true, healthy, and zero respectively;

checking, by the image constructor, whether a TLS public key and private key that are used to encrypt gRPC communication exist on the current construction node; and if the TLS public key and private key exist, enabling a TLS authentication—enabled gRPC server in the image constructor by calling the TLS public key and private key to block monitoring, and waiting for the scheduler to obtain node information of the image constructor or issue a task; and if the image constructor fails to interface to the container engine or the TLS public key and private key that are used to encrypt gRPC communication do not exist, recording, by the image constructor, a cause of failure, generating and recording a message locally, sending fault information to an O&M engineer, and exiting an image constructor program.

6. The distributed container image construction scheduling system according to claim 1, wherein the creating, by the console, an image construction task, and performing, by the scheduler, a check and generating a task message comprises:

creating, by the console on the management node, the task, wherein before the task is created, an image name, a graphics processing unit (GPU) value, a name and version of a development framework, and a third-party dependency are specified and a heterogeneous resource value and test mode value are entered;

serializing, by the console, the task into a structural object and sending the structural object into the scheduler; and checking, by the scheduler, whether the structural object is valid, wherein the checking whether the structural object is valid comprises:

checking whether the image name is empty; and if the image name is empty, generating an error message that indicates an empty image name, sending the error message to the console to inform the user, canceling generating the task, and entering a blocking status again to wait for the user to create a task on the console; or if the image name is not empty, continuing to check, by the scheduler, whether the heterogeneous resource value in the structural object is true; and if the heterogeneous resource value is not true or is empty, generating an error message that indicates an invalid heterogeneous resource value, sending the error message to the console to inform the user, canceling generating the task, and entering a blocking status again to wait for the user to create a task on the console; or if the heterogeneous resource value is true, continuing to check whether the development framework in the structural object is specified; and if the development framework is unspecified, generating an error message that indicates an unspecified development framework, sending the error message to the console to inform the user, canceling generating the task, and entering a blocking status again to wait for the user to create a task on the console; or if the development framework is specified, continuing to check whether the test mode value in the structural object is true; and if the test mode value is not true or is empty, generating an error message that indicates an invalid test mode value, sending the error message to the console to inform the user, canceling generating the task, and entering a blocking status again to wait for the user to create a task on the console; or if the test mode value is true, determining that the task passes the check, and generating, by the scheduler, the task message based on task content.

7. The distributed container image construction scheduling system according to claim 6, wherein the determining the optimal working node from the determined construction nodes comprises:

calculating a performance score and task score for each construction node in the table of active construction nodes, wherein $$\text{Perform Score} = \left(\frac{CpuCores}{\text{Max}CpuCores} + \frac{CpuFrequency}{\text{Max}CpuFrequency}\right) \times 100 \times CpuWeight +$$

$$\left(1 - \frac{SystemLoad}{CpuCores}\right) \times 100 \times LoadWeight +$$

$$\left(\frac{FreeMemory}{TotalMemory} \times 3 + \frac{FreeMemory}{\text{Max}FreeMemory} \times 7\right) \times 100 \times MemoryWeight$$

$$\text{Task Score} = \left(\frac{\text{Max}BuildNumber - BuildNumber}{\text{Max}BuildNumber}\right) \times 100 \times TaskWeight$$

Perform Score indicates the performance score, Task Score indicates the task score, CpuWeight indicates a CPU weight, LoadWeight indicates a load weight, MemoryWeight indicates a memory weight, TaskWeight indicates a task weight, CpuCores indicates the number of CPUs of the construction node, CpuFrequency indicates the clock speed of the construction node, TotalMemory indicates the total memory capacity of the construction node, FreeMemory indicates the available memory capacity of the construction node, BuildNumber indicates the image construction quantity variable, SystemLoad indicates the system load, MaxCpuCores indicates a number of CPUs of a construction node whose CPU quantity is greater than that of any other construction node in the table of active construction nodes, MaxCpuFrequency indicates a clock speed of a construction node whose clock speed is greater than that of any other construction node in the table of active construction nodes, MaxFreeMemory indicates an available memory capacity of a construction node whose available memory capacity is greater than that of any other construction node in the table of active construction nodes, and MaxBuildNumber indicates an image construction quantity of a construction node whose image construction quantity is greater than that of any other construction node in the table of active construction nodes;

using, by the scheduler, a sum of the performance score and task score as a final total score of the construction node and storing the final total score to the cache; and determining, by the scheduler, a construction node having a highest total score as the optimal working node.

8. The distributed container image construction scheduling system according to claim 7, wherein the performing, by the optimal working node, the task and sending feedback on a construction status to the management node comprises:

determining, by an image constructor of the optimal working node, whether values of the status variable and health variable on the optimal working node in a cache of the construction node are true and healthy respectively; and if the values of the status variable and health variable are false and unhealthy respectively, using the values of these two variables as the feedback on the construction status, attaching an error tag, decrementing a value of the image construction quantity variable in the cache of the construction node by one, and sending the feedback on the construction status to the management node, or if the values of the status variable and health variable are true and healthy respectively, incrementing a value of the image construction quantity variable in the cache of the construction node by one; extracting, from the task message, an image name, a GPU value, a name and version of a development framework, a third-party dependency, a heterogeneous resource value, and a test mode value; calling a container engine to construct an image based on these parameters; using, after the image is constructed, a construction completion result from the container engine as the feedback on the construction status, attaching a completion tag, decrementing the value of the image construction quantity variable in the cache of the construction node by one, and sending the feedback on the construction status to the management node; and using, if an error occurs when the image is being constructed by calling the container engine and image construction is stopped, an error message returned by the container engine as the feedback on the construction status, attaching an error tag, decrementing the value of the image construction quantity variable in the cache of the construction node by one, and sending the feedback on the construction status to the management node.

9. The distributed container image construction scheduling system according to claim 1, wherein the determining construction nodes to which the task message can be sent comprises:

creating, by the scheduler on the management node, a table of active construction nodes in a cache, wherein the table comprises IP addresses, gRPC service ports, and communication statuses of construction nodes;

performing communication tests between all construction nodes in the cache of the scheduler and gRPC services of the construction nodes by using the IP addresses and gRPC service ports, and saving construction nodes that successfully communicate with the gRPC services into the table of active construction nodes in the cache;

determining whether the number of active construction nodes in the table of active construction nodes is greater than that of workers; if the number of active construction nodes is greater than that of workers, performing no operation; and if the number of active construction nodes is less than that of workers, setting, by the scheduler, the number of active construction nodes to that of workers, and enabling multiple threads to concurrently obtain resource information and status information of each construction node in the table of active construction nodes, wherein the resource information of each construction node comprises a number of central processing units (CPUs), a CPU clock speed, a total memory capacity, and an available memory capacity of the construction node and a system load, and the status information of each construction node comprises a status variable, health variable, and image construction quantity variable of the construction node;

determining, by the scheduler one after another, whether a value of the status variable of a construction node in the table of active construction nodes is true; and performing no operation if the value of the status variable is true, or deleting the construction node from the table of active construction nodes if the value of the status variable is false;

determining, by the scheduler one after another after values of status variables of all construction nodes are determined, whether a value of the health variable of a construction node in the table of active construction nodes is set to healthy; and performing no operation if the value of the health variable is set to healthy, or deleting the construction node from the table of active construction nodes if the value of the health variable is not set to healthy; and using, after values of health variables of all construction nodes are determined, remaining construction nodes in the table of active construction nodes as the construction nodes to which the task message can be sent.

10. The distributed container image construction scheduling system according to claim 9, wherein the sending, by the scheduler, the task message to the optimal working node and generating a task object comprises:

obtaining, by the scheduler, an IP address and a gRPC service port of the optimal working node;

encrypting, by the scheduler, the task message in a gRPC mode by using a TLS public key and private key of the management node, sending the encrypted task message to the optimal working node based on the IP address and gRPC service port of the optimal working node, and asynchronously generating the task object, wherein the task object comprises the task message, a scheduling node, and a construction status, wherein the scheduling node is the optimal working node and the construction status is set to false; and entering a blocking state of the scheduler and waiting for the optimal working node to send the feedback on the construction status.

11. The distributed container image construction scheduling system according to claim 10, wherein the informing, by the management node, the user of the feedback on the construction status comprises:

checking, by the scheduler on the management node after receiving the feedback on the construction status, whether the feedback on the construction status comprises an error tag, and setting, if the feedback on the construction status does not comprise an error tag, the construction status in the task object to true to indicate that the task is constructed; or checking, by the scheduler if the feedback on the construction status comprises an error tag, whether an error message in the feedback on the construction status indicates an unhealthy construction node; and rescheduling the task if the error message indicates an unhealthy construction node, or sending, if the error message does not indicate an unhealthy construction node, the feedback on the construction status to the console to inform the user of the error message and content.

* * * * *